US012761607B2

(12) United States Patent
Park et al.

(10) Patent No.: US 12,761,607 B2
(45) Date of Patent: Oct. 13, 2026

(54) WEARABLE DEVICE COMPRISING AT LEAST ONE ELECTRODE FOR MEASURING BIOMETRIC INFORMATION

(71) Applicant: Samsung Electronics Co., Ltd., Suwon-si (KR)

(72) Inventors: Jiwoong Park, Suwon-si (KR); Hyuksu Kim, Suwon-si (KR); Wonik Do, Suwon-si (KR); Donghoo Jang, Suwon-si (KR); Jonggwan Jung, Suwon-si (KR); Changhoon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 215 days.

(21) Appl. No.: 18/501,496

(22) Filed: Nov. 3, 2023

(65) Prior Publication Data

US 2024/0061379 A1 Feb. 22, 2024

Related U.S. Application Data

(63) Continuation of application No. PCT/KR2022/006602, filed on May 10, 2022.

(30) Foreign Application Priority Data

May 11, 2021 (KR) ........................ 10-2021-0060838

(51) Int. Cl.
*G04G 21/02* (2010.01)
*G04G 17/06* (2006.01)

(52) U.S. Cl.
CPC ........... *G04G 21/025* (2013.01); *G04G 17/06* (2013.01)

(58) Field of Classification Search
CPC ............................ G04G 21/025; G04G 17/06
See application file for complete search history.

(56) References Cited

U.S. PATENT DOCUMENTS 8,885,867 B1 11/2014 Tai et al.
9,442,525 B2 9/2016 Choi et al.
(Continued)

FOREIGN PATENT DOCUMENTS

CN 107340705 A 11/2017
CN 110794666 A 2/2020
(Continued)

OTHER PUBLICATIONS

International Search Report for PCT/KR2022/006602 mailed Aug. 29, 2022, 5 pages.
(Continued)

*Primary Examiner* — Joanne M Rodden
*Assistant Examiner* — Abigail Bock
(74) *Attorney, Agent, or Firm* — Nixon & Vanderhye, P.C.

(57) ABSTRACT

An example wearable device includes a housing including a first surface facing a first direction, a second surface facing a second direction opposite to the first direction, and a third surface at least partially enclosing a space between the first surface and the second surface; a printed circuit board disposed between the first surface and the second surface; a speaker disposed in a space defined by the third surface between the first surface and the second surface; a flexible printed circuit board that is disposed to surround at least a portion of the speaker device, connects the speaker device and the printed circuit board, and contains a conductive connector in a first area facing the third surface; and at least one first electrode that is connected to the conductive connector to be connected to the flexible printed circuit
(Continued)

board. The third surface includes at least one opening formed in a second area corresponding to the position of the speaker device and a second opening formed in a third area spaced apart from the second area, and at least a portion of the at least one first electrode is exposed to the outside of the third surface of the housing through the second opening.

17 Claims, 10 Drawing Sheets

(56) References Cited

U.S. PATENT DOCUMENTS

| | | | |
|---|---|---|---|
| 10,234,828 | B2 | 3/2019 | Ely et al. |
| 10,595,743 | B2 | 3/2020 | Lee et al. |
| 11,871,178 | B2 | 1/2024 | Park et al. |
| 2015/0342525 | A1 | 12/2015 | Justice et al. |
| 2016/0058375 | A1 | 3/2016 | Rothkopf |
| 2016/0089053 | A1 | 3/2016 | Lee et al. |
| 2017/0215743 | A1 | 8/2017 | Meer et al. |
| 2017/0296120 | A1 | 10/2017 | Namkoong et al. |
| 2018/0228432 | A1 | 8/2018 | Woo et al. |
| 2018/0360326 | A1 | 12/2018 | Lee et al. |
| 2019/0311172 | A1* | 10/2019 | Kang ...................... G06F 3/016 |
| 2020/0064906 | A1 | 2/2020 | Cha |
| 2021/0030359 | A1 | 2/2021 | Jeong et al. |
| 2023/0109385 | A1* | 4/2023 | Han .................... H01M 10/425 381/323 |
| 2024/0280943 | A1 | 8/2024 | Son et al. |

FOREIGN PATENT DOCUMENTS

| | | | |
|---|---|---|---|
| CN | 211267082 | U | 8/2020 |
| KR | 10-2020-0009593 | A | 1/2020 |
| KR | 102130259 | B1 | 7/2020 |
| KR | 20210021657 | A | 3/2021 |
| WO | 2021/020685 | | 2/2021 |

OTHER PUBLICATIONS

Written Opinion of the ISA for PCT/KR2022/006602 mailed Aug. 29, 2022, 3 pages.

Extended Search Report dated Sep. 13, 2024 in European Patent Application No. 22807755.8.

Office Action dated Jun. 30, 2026 in Korean Application No. 10-2021-0060838 with English translation.

* cited by examiner

WEARABLE DEVICE COMPRISING AT LEAST ONE ELECTRODE FOR MEASURING BIOMETRIC INFORMATION

CROSS-REFERENCE TO RELATED APPLICATIONS

This application is a continuation of PCT/KR2022/006602, designating the United States, filed May 10, 2022, in the Korean Intellectual Property Receiving Office, which claims priority to Korean Patent Application No. 10-2021-0060838, filed on May 11, 2021, in the Korean Intellectual Property Office. The contents of each of these applications are incorporated by reference herein in their entireties.

BACKGROUND

Field

The disclosure relates to a wearable device including at least one electrode for measuring biometric information.

Description of Related Art

As the mobile market enters a mature stage, a wearable electronic device that provides a new type of function in conjunction with an existing mobile device, a so-called wearable device, has been proposed. The wearable device can support a fusion between a user and a technology in that it is worn on or attached to a user's body and operated. For example, a wearable device can measure user's biometric information (e.g., body composition) using bioelectrical impedance analysis (BIA), and provide the measured biometric information through an application of the wearable device or an application of a mobile device interworking with the wearable device.

SUMMARY

In measuring user's biometric information, a wearable device requires an electrode for contacting a user's body and acquiring a signal corresponding to the biometric information. The electrode may be disposed in a space prepared in some components (e.g., a display or a strap) of the wearable device exposed to the outside, for easy contact with the user's body. However, the wearable device is recognized as a design product capable of expressing a user's personality beyond the simple concept of an electronic device, and thus an existing electrode arrangement structure can degrade the aesthetics of the wearable device, or act as a restriction on a size design of the wearable device.

Various example embodiments disclosed in the present document may provide a wearable device including at least one electrode for biometric information measurement, in which an electrode arrangement structure is implemented using a component located in an internal space of the wearable device.

A wearable device according to an example embodiment may include a housing including a first surface facing a first direction, a second surface facing a second direction opposite to the first direction, and a third surface at least partially surrounding a space between the first surface and the second surface, a printed circuit board disposed between the first surface and second surface of the housing, a speaker device disposed in a cavity formed by the third surface of the housing, between the first surface and second surface of the housing, a flexible printed circuit board disposed to surround at least a part of the speaker device and electrically connecting the speaker device and the printed circuit board, and including a conductive connector in a first area facing the third surface of the housing, and at least one first electrode connected to the conductive connector and electrically connected to the flexible printed circuit board.

According to an example embodiment, the third surface of the housing may include at least one first opening formed in a second area corresponding to the position of the speaker device, and a second opening formed in a third area spaced a specified distance apart from the second area.

According to an example embodiment, the at least one first electrode may be at least partially exposed to the outside of the third surface of the housing through the second opening.

A wearable device of according to an example embodiment may include a housing including a first surface facing a first direction, a second surface facing a second direction opposite to the first direction, and a third surface at least partially surrounding a space between the first surface and the second surface, a printed circuit board disposed between the first surface and second surface of the housing, a speaker device disposed in a cavity formed by the third surface of the housing, between the first surface and second surface of the housing, a flexible printed circuit board disposed to surround at least a part of the speaker device and electrically connected to the printed circuit board, and including a first conductive connector in a first area facing the third surface of the housing, and at least one first electrode connected to the first conductive connector and electrically connected to the flexible printed circuit board.

According to an example embodiment, the at least one first electrode may be disposed to be at least partially exposed to the outside of the third surface of the housing through an opening formed in the third surface of the housing.

According to an example embodiment, the flexible printed circuit board may be electrically connected to the at least one first electrode, based on the first conductive connector, and provide a first signal path between the at least one first electrode and the printed circuit board, and may be electrically connected to the speaker device, based on the second conductive connector included in the second area, and provide a second signal path between the speaker device and the printed circuit board.

According to various example embodiments, an electrode arrangement structure for acquiring biometric information may be implemented using a component located in an internal space of a wearable device, thereby improving the aesthetics of the wearable device and improving a degree of freedom in size design.

In addition, various effects identified directly or indirectly through the present document may be provided.

BRIEF DESCRIPTION OF THE DRAWINGS

The above and/or other aspects of the disclosure will be more apparent by describing certain embodiments of the disclosure with reference to the accompanying drawings, in which.

In connection with the description of the drawings, the same reference numerals may be assigned to the same or corresponding components.

DETAILED DESCRIPTION

Hereinafter, various example embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents.

Figure 1:
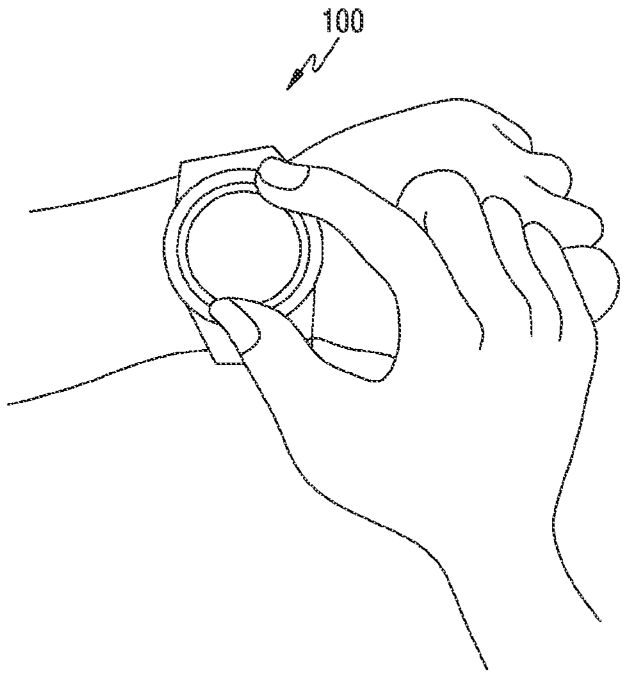
FIG. 1 is a diagram illustrating an operating environment of an example wearable device according to various embodiments.

FIG. 1 is a diagram illustrating an operating environment of an example wearable device according to various embodiments.

Referring to FIG. 1, a wearable device 100 of an example embodiment may be worn or attached to a user's body and operated. The wearable device 100 is not limited in its type as long as it includes a function, hardware structure, or component described below but, in various embodiments described below, a smart watch or smart band worn on a user's wrist may be referred as an example of the wearable device 100.

In an example embodiment, in a state in which the wearable device 100 is worn on a user's wrist, the wearable device 100 may measure user's biometric information (e.g., body composition), based on a contact of a user's body with a plurality of electrodes included in the wearable device 100. For example, the wearable device 100 may supply a micro current to the user's body using at least some of the plurality of electrodes, and measure the biometric information, based on bio impedance acquired according to this.

According to an example embodiment, the wearable device 100 may include at least one application (e.g., an application supporting a health care service), and may visually or aurally transmit biometric information measured based on the execution of the application. According to an embodiment, the wearable device 100 may interwork with a mobile device (e.g., smart phone) including the at least one application, and may transmit data related to the measured biometric information to the mobile device, thereby requesting the mobile device to present the biometric information through the execution of the application.

Figure 2:
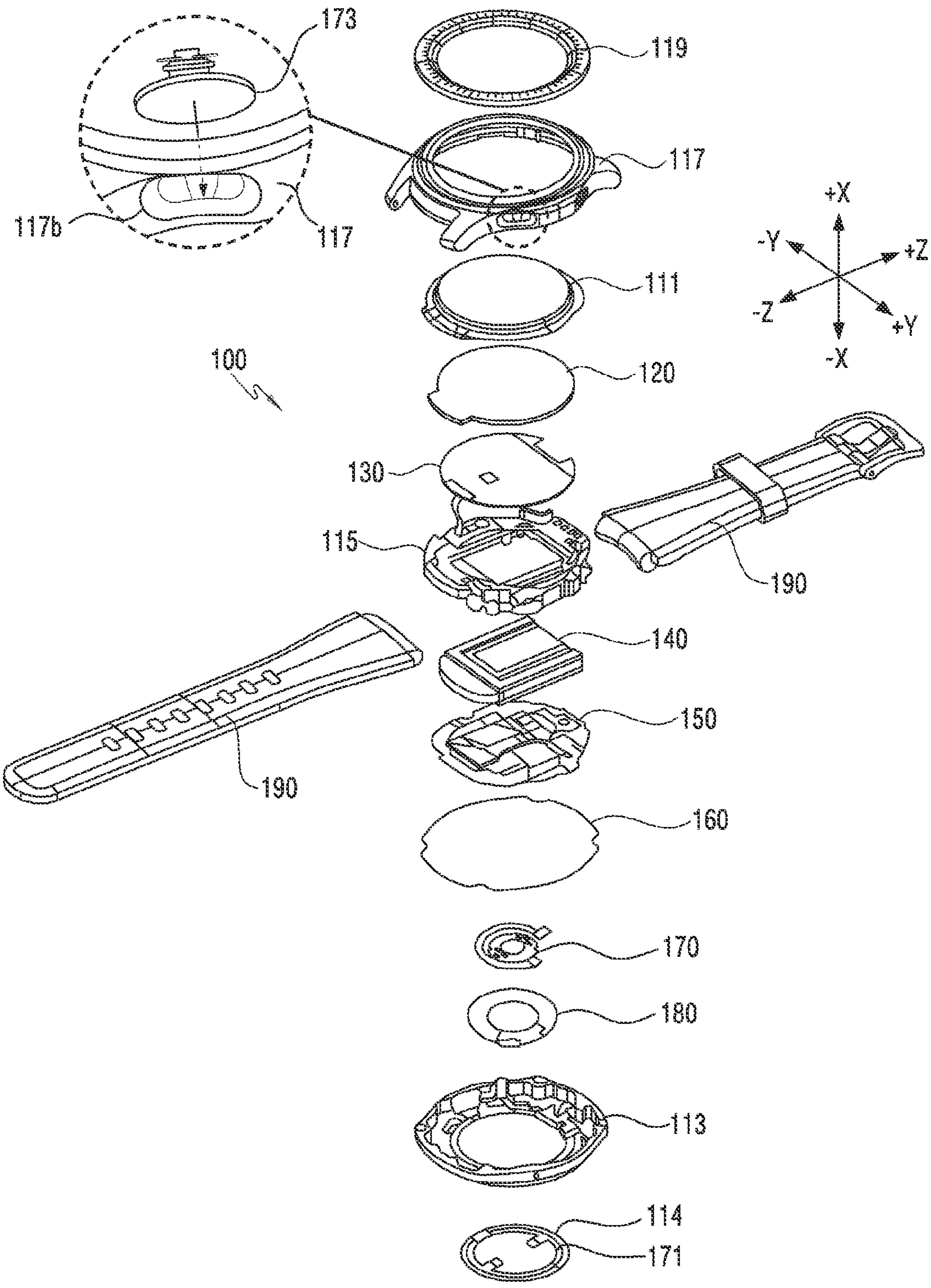
FIG. 2 is a diagram illustrating an exploded view of an example wearable device according to various embodiments.

FIG. 2 is a diagram illustrating an exploded view of an example wearable device according to an embodiment.

Referring to FIG. 2, the wearable device 100 of an example embodiment may include a housing including a front plate 111 (for example, a first surface) facing a first direction (e.g., a +X direction), a rear plate 114 (for example, at least a part of a second surface) facing a second direction (e.g., −X direction) opposite to the first direction, a rear cover 113 (for example, at least a part of the second surface) coupled to the rear plate 114 in the second direction (e.g., −X direction), and a side bezel structure 117 (for example, a third surface) surrounding at least a part of a space between the front plate 111 and the rear plate 114. According to various embodiments, the housing may also refer, for example, to a structure forming at least a part of the front plate 111, the rear plate 114, the rear cover 113, and the side bezel structure 117.

According to an example embodiment, a front surface of the wearable device 100 may be formed by the front plate 111 (e.g., glass plate or polymer plate) of which at least a portion is substantially transparent. According to an example embodiment, a rear surface of the wearable device 100 may be formed by a combination of the rear plate 114 (e.g., a coated or colored glass plate, a ceramic plate, a polymer plate, a metal (aluminum, stainless steel, or magnesium) plate, or a combination of at least two or more of them) of which at least a portion is substantially opaque and the rear cover 113 of which at least a portion coupled to the rear plate 114 is substantially opaque. In an example embodiment, a side surface of the wearable device 100 may be formed by the side bezel structure 117 coupled to the front plate 111 and the rear plate 114 (or rear cover 113) and including at least one of a metal and a polymer. In various embodiments, when at least a part of the side bezel structure 117 includes a metal, the side bezel structure 117 may function, for example, as an antenna radiator of the wearable device 100.

In an example embodiment, the front plate 111, the rear plate 114, the rear cover 113, and the side bezel structure 117 may be coupled to each other in at least one area and form a housing of the wearable device 100 including an internal space. In various embodiments, the rear plate 114 (or the rear cover 113) and the side bezel structure 117 may be integrally formed, or the rear plate 114 and the rear cover 113 may be integrally formed. In various embodiments, the front plate 111 may include a key input device 119 (e.g., a wheel key) that is disposed on the front plate 111 and is rotatable in at least one direction. The key input device 119 may have a shape corresponding to the front plate 111 or the side bezel structure 117 coupled to the front plate 111.

In an example embodiment, the wearable device 100 may further include at least one strap 190 connected to at least a part of the housing and supporting the wearing of the wearable device 100 on a user's body. In various embodiments, the at least one strap 190 may be integrally formed by a woven fabric, leather, rubber, urethane, metal, ceramic, or a combination of at least two or more of these, or be coupled and formed wherein a plurality of unit links are movable with respect to each other.

In an example embodiment, the wearable device 100 may further include at least one component that is disposed in an internal space (e.g., a space defined by a combination of the front plate 111, the rear plate 114, the rear cover 113, and the side bezel structure 117) of the housing and hidden from the outside, or is at least partially exposed to the outside in a state of being disposed in the internal space of the housing. For example, the wearable device 100 may include at least one of a display 120 disposed between the front plate 111 and the rear plate 114, an antenna 130, a support member 115 (or bracket), a battery 140, a printed circuit board 150, a sealing member 160, a biometric sensor module 170, and a wireless charging coil 180. In various embodiments, the wearable device 100 may not include at least one of the above-described components or may additionally include other components. For example, the wearable device 100 may further include at least one of a connector hole capable of accommodating a connector for transmitting and receiving at least one of power, signals, and data with an external device, and a connector cover capable of blocking or reducing the introduction of external foreign substances into the connector hole. For another example, the wearable device 100 may further include a speaker device (e.g., a speaker device 500 of FIG. 6 or a sound output module 1055 of FIG. 10) supporting sound output and a flexible printed circuit board (e.g., a flexible printed circuit board 600 of FIG. 6) supporting electrical connection between components.

In an example embodiment, the display 120 may be exposed to the outside through at least a part of the substantially transparent front plate 111, and may present displaying of various contents, based on this. For example, the display 120 may visually present user's biometric information measured using the biometric sensor module 170. In various embodiments, the display 120 may be disposed to be coupled to or adjacent to at least one of a touch sensing circuit, a pressure sensing circuit, and a fingerprint sensing circuit.

In an example embodiment, the antenna 130 may include at least one of a near field communication (NFC) antenna, a wireless charging antenna, and a magnetic secure transmission (MST) antenna, which are disposed between the display 120 and the support member 115. In an example embodiment, the antenna 130 may perform short-range communication with an external device, or wirelessly transmit/receive power required for charging the wearable device 100 or charging the external device. In an embodiment, the antenna 130 may transmit a short-range communication signal, or a magnetic-based signal including payment data.

In an example embodiment, the support member 115 may be coupled to the side bezel structure 117 in the internal space of the housing. For example, an edge area of the support member 115 may be coupled to an inner surface of the side bezel structure 117. In an embodiment, the support member 115 may be integrally formed with the side bezel structure 117 and form a part (e.g., a side surface of the wearable device 100) of the housing. In an example embodiment, the display 120 may be coupled to one surface of the support member 115 facing a first direction (e.g., +X direction), and the printed circuit board 150 may be coupled the other surface facing a second direction (e.g., −X direction).

In an example embodiment, the battery 140 may supply power to at least some of the components of the wearable device 100, and may include a rechargeable secondary battery. In an example embodiment, at least a part of the battery 140 may be disposed on a substantially coplanar surface with the printed circuit board 150. In various embodiments, the battery 140 may be disposed integrally with the housing in the internal space of the housing, or be disposed detachably in the internal space of the housing.

In an example embodiment, at least one of a processor (e.g., a processor 910 of FIG. 9 or a processor 1020 of FIG. 10), an audio codec device (e.g., an audio codec 920 of FIG. 9), a memory (e.g., a memory 1030 of FIG. 10), and an interface may be disposed on the printed circuit board 150. In an example embodiment, the processor may, for example, include at least one of a central processing unit, an application processor, a graphic processing unit (GPU), a sensor processor, and a communication processor, and the memory may, for example, include at least one of a volatile memory and a non-volatile memory. In an example embodiment, the interface may include at least one of a conductive connector and conductive solder for electrically connecting the printed circuit board 150 and other components.

In an example embodiment, the sealing member 160 may be disposed between the side bezel structure 117 and the rear plate 114, to block or reduce moisture or a foreign substance introduced into the internal space of the housing from the outside.

In an example embodiment, the biometric sensor module 170 may provide an electrical signal or data value corresponding to biometric information (e.g., at least one of photoplethysmography information or electrocardiogram information) of a user who wears the wearable device 100. In an example embodiment, the biometric sensor module 170 may be electrically connected to the processor disposed on the printed circuit board 150, and may present the provided electrical signal or data value to the processor. In an example embodiment, the biometric sensor module 170 may include a plurality of electrodes 171 and 173 that support biometric information measurement, and may be electrically connected to the plurality of electrodes 171 and 173, based on a separate conductive member. The plurality of electrodes 171 and 173 may include, for example, at least one first electrode 173 disposed adjacent to the side bezel structure 117 in the internal space of the housing and exposed to the outside through an opening 117*b* (e.g., second opening) prepared in the side bezel structure 117, and at least one second electrode 171 disposed on the rear plate 114 and exposed to the outside.

In an example embodiment, the wireless charging coil 180 may support wireless charging of the wearable device 100. For example, the wireless charging coil 180 may be used to transmit wireless power to a wireless charging coil of an external device that is in contact with or adjacent to the wearable device 100, or to receive wireless power from the wireless charging coil of the external device.

Figure 3:
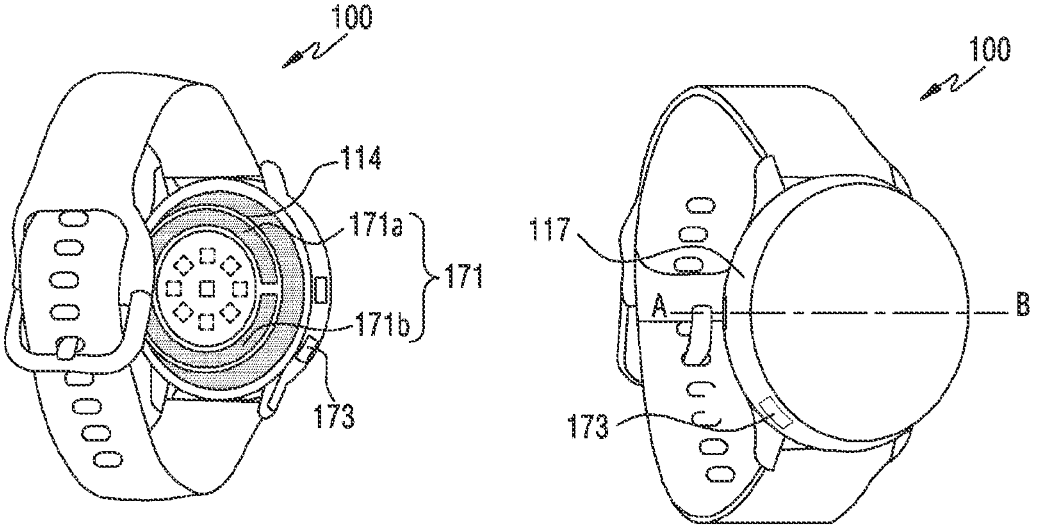
FIG. 3 is a diagram illustrating a front surface and rear surface of an example wearable device according to various embodiments.

FIG. 3 is a diagram illustrating a front surface and rear surface of an example wearable device according to various embodiments.

Referring to FIG. 3, a plurality of electrodes included in a biometric sensor module (e.g., the biometric sensor module 170 of FIG. 2) of an example embodiment may include at least one first electrode 173 and a plurality of second electrodes 171 (e.g., the electrode 171*a* and the electrode 171*b*). According to an example embodiment, at least a part of each of the at least one first electrode 173 and the plurality of second electrodes 171 may be exposed to the outside through the housing of the wearable device 100. For example, at least a part of the at least one first electrode 173 may be exposed to the outside through the side bezel structure 117 (or the third surface) forming the housing, and at least a part of each of the plurality of second electrodes 171 may be disposed on the rear plate 114 (or at least a part of the second surface) forming the housing and be exposed to the outside. In an example embodiment, the at least one first electrode 173 may be disposed in a mutually symmetrical position or structure in the internal space of the housing, and thus may be exposed symmetrically through the side bezel structure 117. Also, the plurality of second electrodes 171 may be disposed in a mutually symmetrical position or structure on a surface of the housing, and thus may be exposed symmetrically through the rear plate 114. According to various embodiments, a position on the wearable device 100 where the at least one first electrode 173 is disposed is not limited to the embodiment shown in FIG. 3. For example, the at least one first electrode 173 may be disposed in a lower left side area or lower right side area of the side bezel structure 117 according to a layout structure of a speaker device (e.g., the speaker device 500 of FIG. 5) described later, based on the front surface of the wearable device 100 shown in FIG. 3.

In an example embodiment, the biometric sensor module 170 may measure biometric information (e.g., photoplethysmography information or electrocardiogram information) of a user who wears the wearable device 100, and, in this regard, the at least one first electrode 173 and plurality of second electrodes 171 included in the biometric sensor module 170 may be used to acquire an electrical signal or data corresponding to the biometric information from a user's body.

Figure 4:
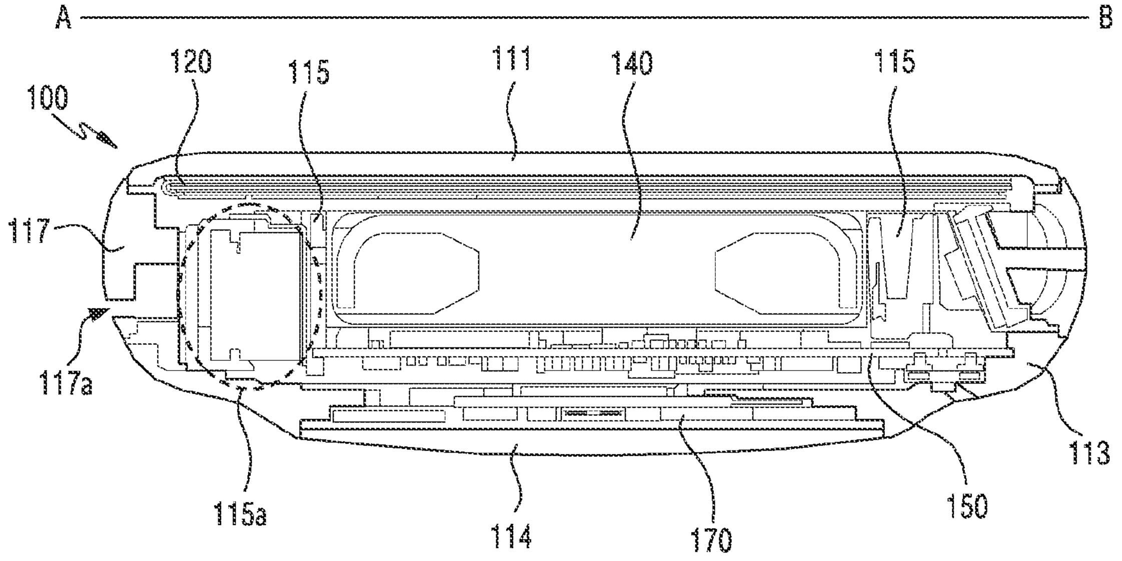
FIG. 4 is a diagram illustrating a cross section of one area of an example wearable device according to various embodiments.
Figure 5:
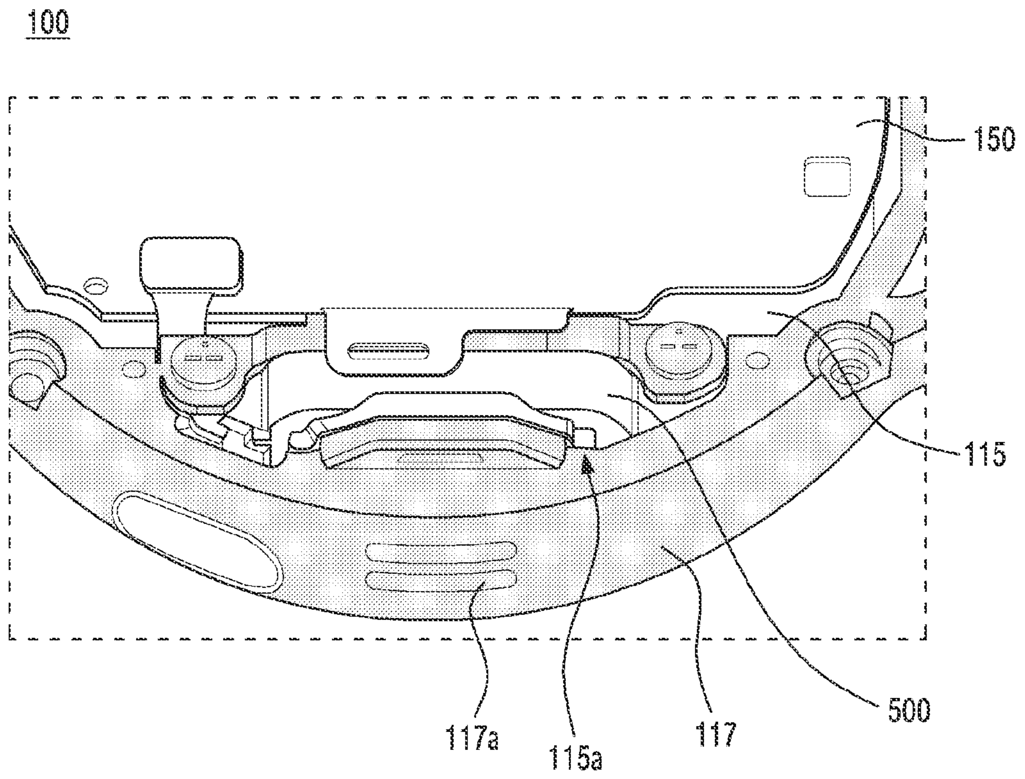
FIG. 5 is a diagram illustrating one area within an example wearable device in which a speaker device is disposed according to various embodiments.

FIG. 4 is a diagram illustrating a cross section of one area of example wearable device according to various embodiments. FIG. 5 is a diagram illustrating one area within an example wearable device in which a speaker device is disposed according to various embodiments.

In FIG. 4, one area of the wearable device (e.g., the wearable device 100 of FIG. 2) may be understood as an A-B area shown in FIG. 3. FIG. 5 may be understood as a drawing showing an edge area within the wearable device 100 when viewing, in a second direction (e.g., −X direction in FIG. 2), the wearable device 100 in which a rear plate (e.g., rear plate 114 of FIG. 2), a rear cover (e.g., rear cover 113 of FIG. 2), and a sealing member (e.g., sealing member 160 of FIG. 2) are removed.

At least some of the components of the wearable device 100 shown in FIG. 4 and FIG. 5 may be the same as or similar to the components described above with reference to FIG. 2, and an overlapping description of the same or similar component will not be repeated below.

Referring to FIG. 4 and FIG. 5, a speaker device 500 (e.g., a sound output module 1055 of FIG. 10) for outputting sound data stored in a memory (e.g., a memory 1030 of FIG. 10) may be disposed in an internal space defined by a housing of the wearable device 100 of an example embodiment. In this regard, a cavity **115*a* for disposing the speaker device 500 may be formed in the support member 115 or a set structure in which the support member 115 and the side bezel structure 117 are integrally formed. For example, the cavity 115*a* may be formed adjacent to an edge of one side of the support member 115. For another example, the cavity 115*a* may be formed in one area of the support member 115 adjacent to an inner surface of the side bezel structure 117, on the set structure in which the support member 115 and the side bezel structure 117 are integrally formed. According to various embodiments, the cavity 115*a* may be formed in a shape having at least one of a size, area, width, or depth corresponding to the speaker device 500 (or capable of accommodating the speaker device 500). In various embodiments, the cavity 115*a* may include at least one member for supporting the speaker device 500 disposed in the cavity 115*a*, fixing the speaker device 500 relative to the support member 115, or supporting the coupling between the speaker device 500 and the support member 115**.

According to an example embodiment, the speaker device 500 may be disposed in the cavity **115*a* of the support member 115 or the set structure in which the support member 115 and the side bezel structure 117 are integrated. For example, at least a part of the speaker device 500 may be disposed to be accommodated in the cavity 115*a*. In this case, at least a part of the speaker device 500 disposed in the cavity 115*a* may be surrounded by the support member 115, and at least a part of one surface of the speaker device 500 may face an inner surface of the side bezel structure 117**.

According to an example embodiment, at least one first opening **117*a* may be formed in one area of the side bezel structure 117 corresponding to (or facing) the speaker device 500 disposed in the cavity 115*a*. For example, the at least one first opening 117*a* may be formed in the form of passing through one area of the side bezel structure 117 corresponding to the speaker device 500, and function as a path for outflow of a sound outputted from the speaker device 500. According to various embodiments, the at least one first opening 117*a*** may have a shape extending at a specified length between one direction and another direction opposite to the one direction.

According to an example embodiment, a resonance space for increasing an amplitude of a sound outputted from the speaker device 500 may be formed in one area of the side bezel structure 117 corresponding to (or facing) the speaker device 500 disposed in the cavity **115*a*. For example, the resonance space may be formed in a structure in which an inner surface of one area of the side bezel structure 117 corresponding to (or facing) the speaker device 500 is indented toward an outer surface, and the resonance space may be connected to the at least one first opening 117*a*. In an example embodiment, the resonance space formed from the inner surface of one area of the side bezel structure 117 may be connected to the outside through the at least one first opening 117*a* on the outer surface of one area of the side bezel structure 117**.

According to an example embodiment, in a state in which at least a part of the speaker device 500 is disposed in the cavity **115*a*, the printed circuit board 150 may be disposed in one surface of the support member 115 facing the second direction (e.g., −X direction of FIG. 2). In various embodiments, the printed circuit board 150 may be disposed to avoid the speaker device 500 disposed in the cavity 115*a*, or may be disposed to overlap at least a part of the speaker device 500**.

Figure 6A:
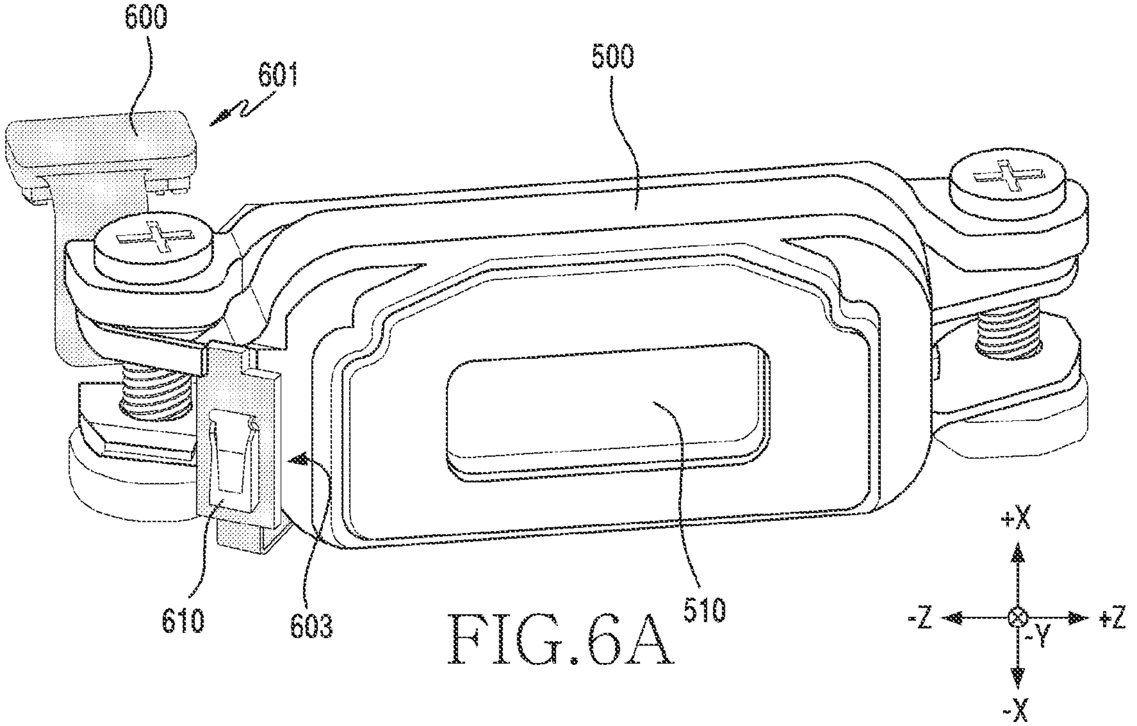
FIGS. 6A and 6B are diagrams illustrating an arrangement structure between a speaker device and flexible printed circuit board of an example wearable device according to various embodiments.
Figure 6B:
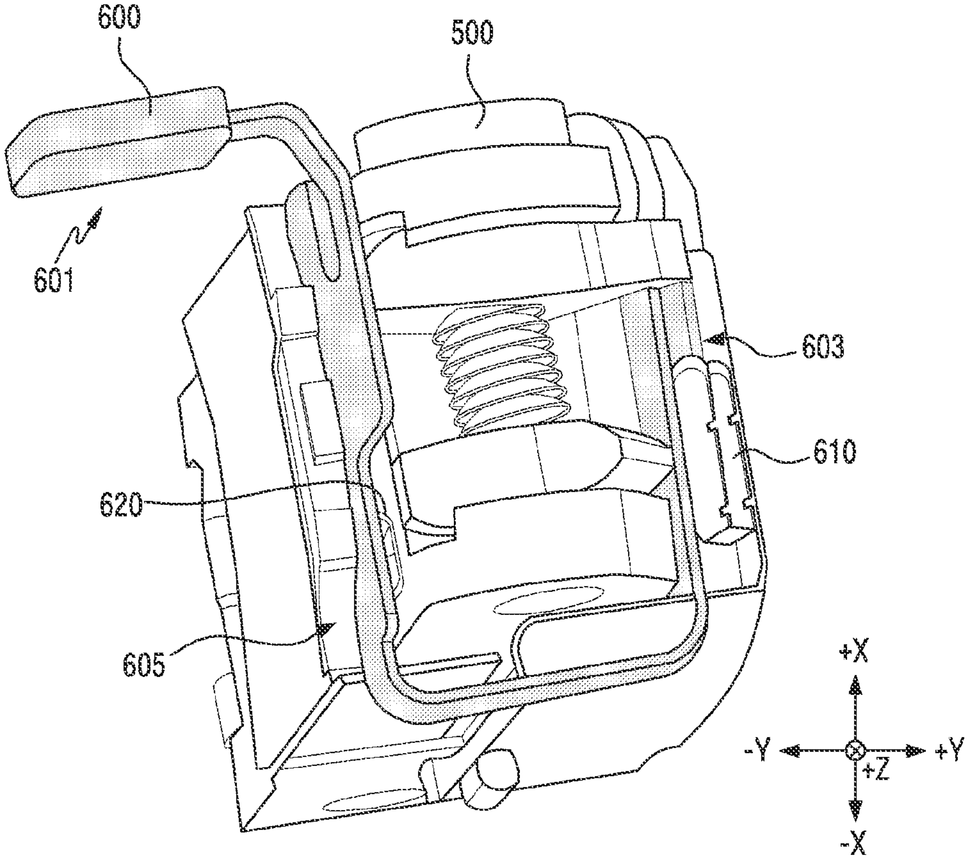
Figure 7:
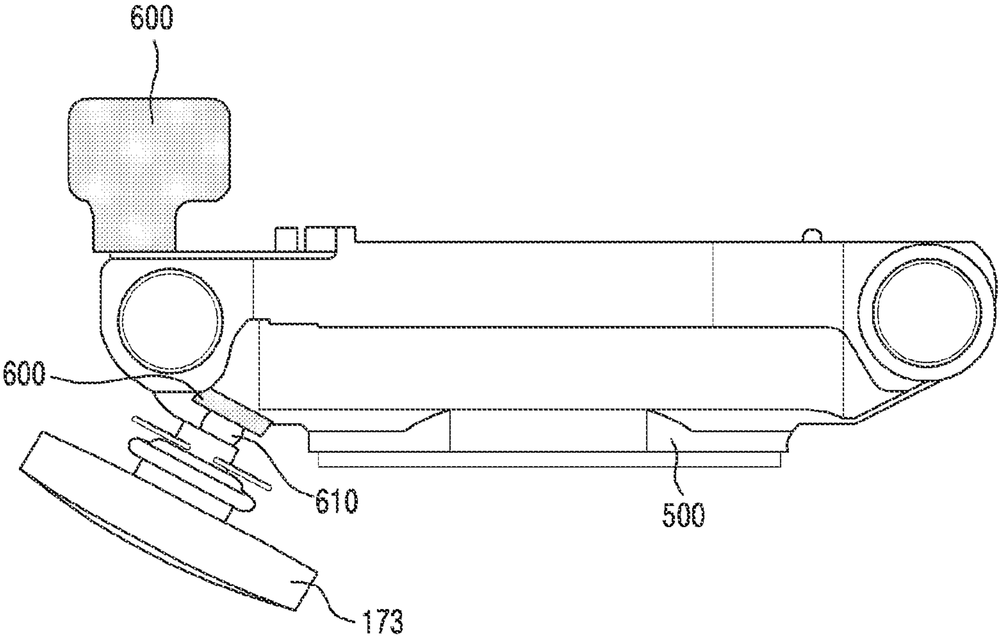
FIG. 7 is a diagram illustrating a connection structure between a flexible printed circuit board and at least one first electrode of an example wearable device according to various embodiments.
Figure 8:
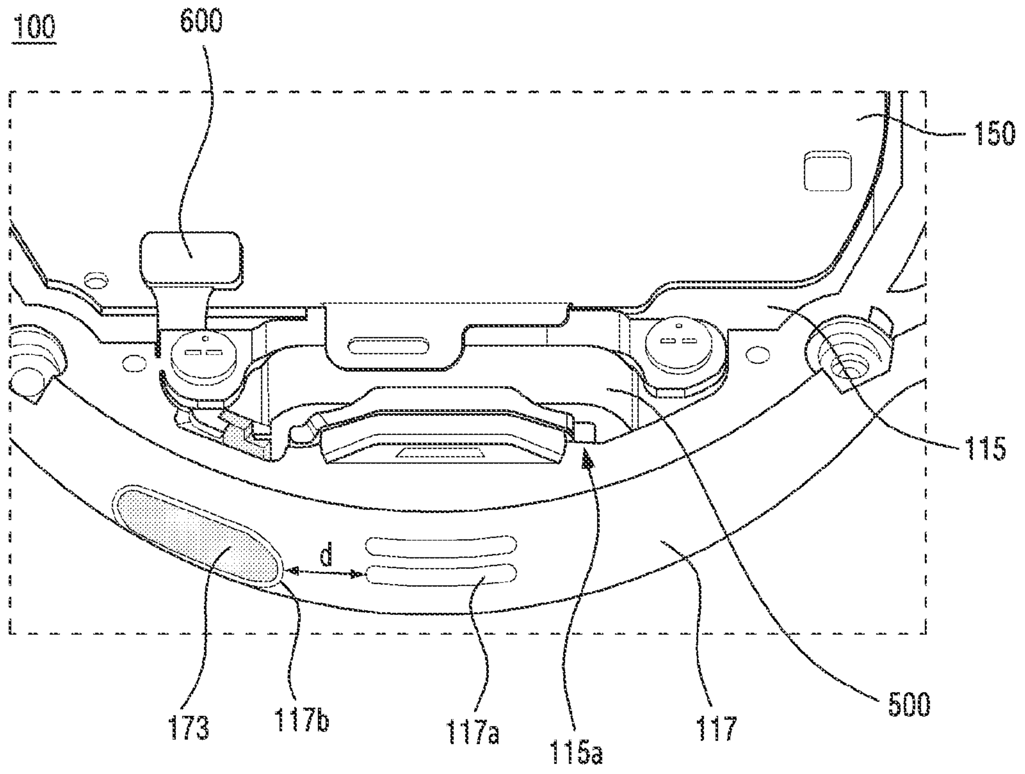
FIG. 8 is a diagram illustrating one area within an example wearable device in which a speaker device and at least one first electrode are disposed according to various embodiments.

FIGS. 6A and 6B are diagrams illustrating an arrangement structure between a speaker device and a flexible printed circuit board of an example wearable device according to various embodiments. FIG. 7 is a diagram illustrating a connection structure between the flexible printed circuit board and at least one first electrode of an example wearable device according to various embodiments. FIG. 8 is a diagram illustrating one area within an example wearable device in which the speaker device and the at least one first electrode are disposed according to various embodiments.

FIG. 6A is a diagram showing an arrangement structure between a speaker device and a flexible printed circuit board, viewed from a third direction shown in FIG. 2 (e.g., the +Y direction of FIG. 2), and FIG. 6B may be understood as a diagram showing the arrangement structure between the speaker device and the flexible printed circuit board, viewed from a fourth direction shown in FIG. 2 (e.g., the −Z direction of FIG. 2).

FIG. 8 may be understood as a diagram showing an edge area within the wearable device 100 when viewing, in a second direction (e.g., the −X direction of FIG. 2), a wearable device (e.g., the wearable device 100 of FIG. 2) in which a rear plate (e.g., the rear plate 114 of FIG. 2), a rear cover (e.g., the rear cover 113 of FIG. 2), and a sealing member (e.g., the sealing member 160 of FIG. 2) are removed.

Referring to FIGS. 6A and 6B, FIG. 7 and FIG. 8, a speaker device 500 of an example embodiment may be electrically connected to a flexible printed circuit board 600. For example, the flexible printed circuit board 600 may be disposed between the speaker device 500 and the printed circuit board 150, and support electrical connection between the speaker device 500 and the printed circuit board 150.

In an example embodiment, the flexible printed circuit board 600 may be formed in a shape corresponding to the speaker device 500 in order to overcome a spatial restriction on an internal space of a housing (e.g., a space defined by a combination of the front plate 111, the rear plate 114, the rear cover 113, and the side bezel structure 117 of FIG. 2) (or in order to solve an interrupt on another component to be disposed in the internal space of the housing). For example, the flexible printed circuit board 600 may be formed in a shape of surrounding at least a part of the speaker device 500, by including a material having a flexible characteristic at least in part and bending a plurality of times along an outer surface of the speaker device 500 in a peripheral area of the speaker device 500.

According to an example embodiment, one area 601 (e.g., one end) of the flexible printed circuit board 600 may be electrically connected to the printed circuit board 150 disposed on one surface of the support member 115 facing a second direction (e.g., –X direction of FIG. 2). Another area 605 of the flexible printed circuit board 600 may be electrically connected to the speaker device 500, based on a conductive connector 620 (e.g., second conductive connector) included in the another area 605. In various embodiments, the conductive connector 620 may include a conductive pad, and support a soldering connection between the flexible printed circuit board 600 and the speaker device 500. Based on this, the flexible printed circuit board 600 may form a signal path between the speaker device 500 and the printed circuit board 150. For example, the flexible printed circuit board 600 may function as a path delivering, to the speaker device 500, a sound signal or data presented from a processor (e.g., a processor 1020 of FIG. 10) or audio codec (e.g., an audio codec 920 of FIG. 9) disposed on the printed circuit board 150.

In an example embodiment, when the flexible printed circuit board 600 is disposed in the internal space of the housing, a further area 603 (e.g., the other end) of the flexible printed circuit board 600 may extend and bend adjacent to an inner surface of the side bezel structure 117 forming the housing, and face the inner surface of the side bezel structure 117. In an example embodiment, the further area 603 of the flexible printed circuit board 600 may include a conductive connector 610 (e.g., first conductive connector) supporting electrical connection with at least one first electrode (e.g., the at least one first electrode 173 of FIG. 3). For example, the conductive connector 610 may be disposed toward the inner surface of the side bezel structure 117 on the further area 603 of the flexible printed circuit board 600. According to various embodiments, the conductive connectors 610 and 620 may include at least one of a C-clip connector or a conductive solder but, in addition to this, may include various types of conductive parts capable of supporting electrical connection between the flexible printed circuit board 600 and the at least one first electrode 173.

In an example embodiment, the speaker device 500 may include a vibration plate 510 that is formed in one surface of the speaker device 500 to provide a sound to be outputted. In an example embodiment, the speaker device 500 may be accommodated in the cavity 115*a* wherein the vibration plate 510 faces (or meets) the inner surface of the side bezel structure 117. In this case, the vibration plate 510 may face the resonance space and the at least one first opening 117*a* that are formed in one area of the side bezel structure 117 corresponding to the speaker device 500.

In an example embodiment, the at least one first electrode 173 may be electrically connected to the conductive connector 610 included in the further area 603 of the flexible printed circuit board 600. Based on this, the flexible printed circuit board 600 may form a signal path between the at least one first electrode 173 and the printed circuit board 150. For example, the flexible printed circuit board 600 may function as a path delivering an electrical signal or data related to biometric information of a user's body acquired by the at least one first electrode 173 to a processor (e.g., a processor 1020 of FIG. 10) disposed on the printed circuit board 150 or a biometric sensor electrically connected to the printed circuit board 150 (e.g., the biometric sensor 170 of FIG. 2).

In an example embodiment, the side bezel structure 117 may include the second opening 117*b* for exposing at least a part of the at least one first electrode 173 to the outside of the housing wherein the user's body may come into contact with the at least one first electrode 173. For example, when the at least one first electrode 173 connected to the conductive connector 610 of the flexible printed circuit board 600 is disposed in the internal space of the housing, the second opening 117*b* may be formed in one area of the side bezel structure 117 corresponding to the at least one first electrode 173. In an example embodiment, the second opening 117*b* may be formed in a shape of penetrating one area of the side bezel structure 117 and exposing at least one first electrode 173 disposed in the internal space of the housing to the outside of the housing. According to various embodiments, the second opening 117*b* may be formed in a shape having at least one of a size, area, width, or depth corresponding to the at least one first electrode 173 (or capable of accommodating at least a part of the at least one first electrode 173). In various embodiments, a sealing member for blocking or reducing moisture or foreign substances introduced from the outside through the second opening 117*b* may be disposed between the second opening 117*b* and the at least one first electrode 173 exposed to the outside through the second opening 117*b*. According to various embodiments, the one area of the side bezel structure 117 where the second opening 117*b* is formed may be implemented with a non-conductive material. In an embodiment, the one area of the side bezel structure 117 of a specified area range surrounding an edge of the second opening 117*b* may be implemented with a non-conductive material.

In an example embodiment, the at least one first opening 117*a* and the second opening 117*b* included in the side bezel structure 117 may have a specified separation distance (d) from each other. The separation distance (d) may, for example, correspond to a distance between the at least one first electrode 173 connected to the conductive connector 610 of the flexible printed circuit board 600 and the vibration plate 510 of the speaker device 500 connected to the flexible printed circuit board 600.

Figure 9:
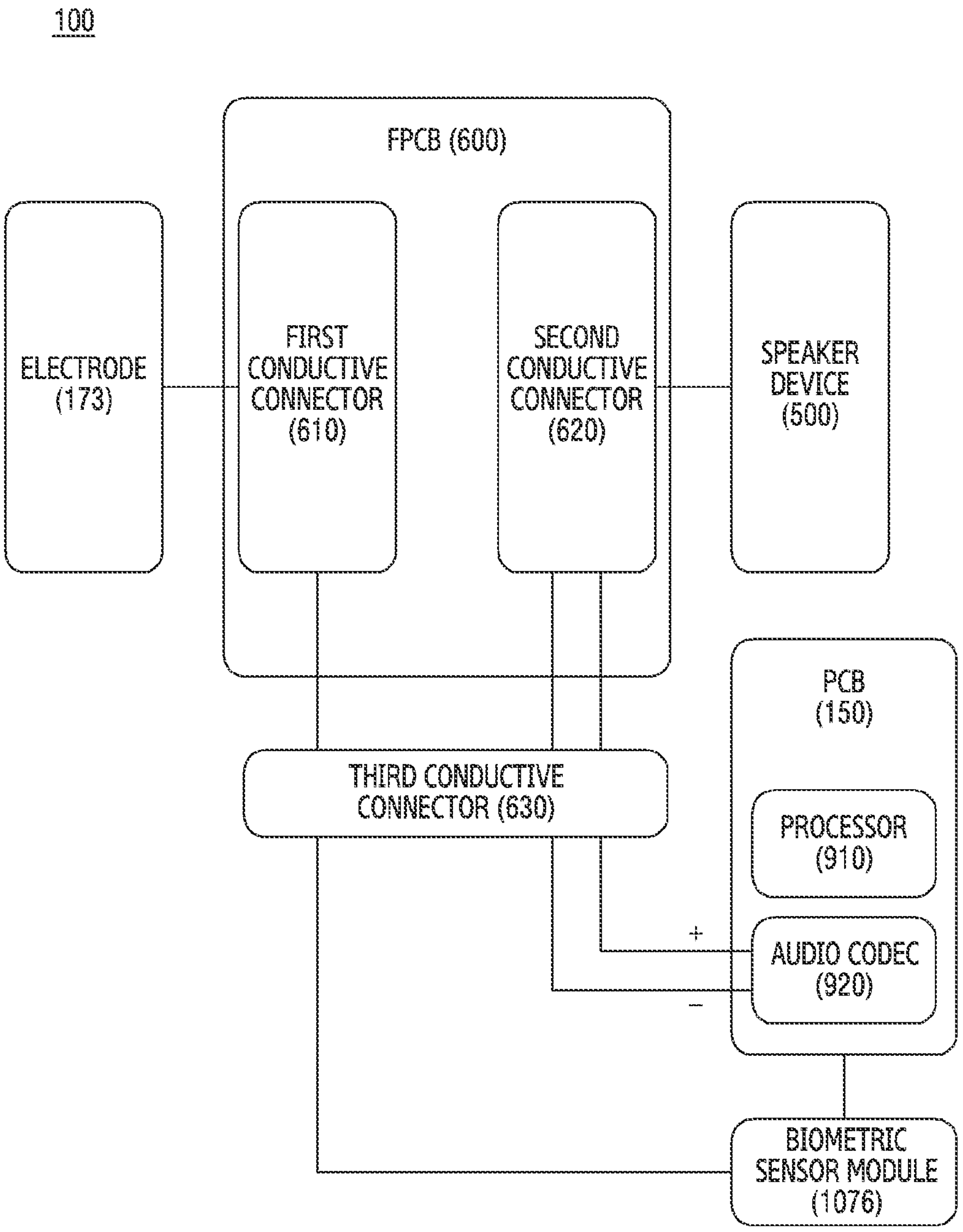
FIG. 9 is a diagram illustrating some components of an example wearable device according to various embodiments.

FIG. 9 is a diagram illustrating some components of an example wearable device according to various embodiments.

In the following description of an example embodiment with respect to FIG. 9, an overlapping description of components identical to those of the above-described wearable device may not be repeated.

Figure 10:
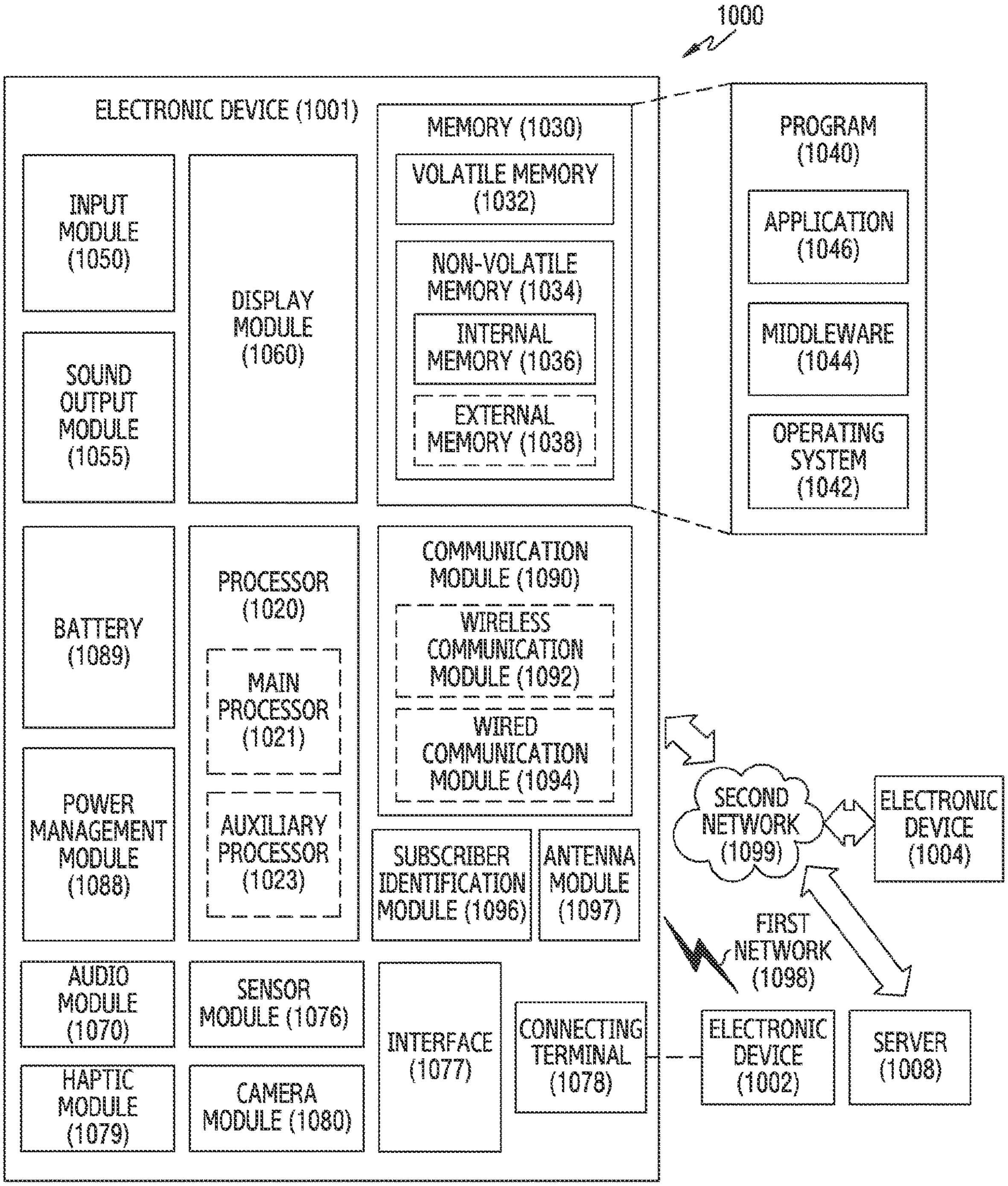
FIG. 10 is a diagram illustrating an example electronic device in a network environment according to various embodiments.

Referring to FIG. 9, the wearable device 100 of an example embodiment may include at least one first electrode 173, a flexible printed circuit board 600, a speaker device 500, a printed circuit board 150, and a biometric sensor module 1076 (e.g., a sensor module 1076 of FIG. 10). In an example embodiment, the flexible printed circuit board 600 may be disposed to extend and bend along an outer surface of the speaker device 500 and surround at least a part of the speaker device 500. In an example embodiment, one area of the flexible printed circuit board 600 (e.g., 601 of FIG. 6, one end of the flexible printed circuit board 600) may be electrically connected to the printed circuit board 150, based on a third conductive connector 630 prepared between the flexible printed circuit board 600 and the printed circuit board 150. In an example embodiment, another area (e.g., 605 of FIG. 6) of the flexible printed circuit board 600 may be electrically connected to the speaker device 500 through a second conductive connector 620, and a further area (e.g., 603 of FIG. 6, the other end of the flexible printed circuit board 600) may be electrically connected to the at least one first electrode 173 through a first conductive connector 610. In various embodiments, the first conductive connector 610, the second conductive connector 620, and the third conductive connector 630 may include at least one of a C-clip connector or a conductive solder.

According to various embodiments, the flexible printed circuit board 600 may form a signal path between the speaker device 500 and the printed circuit board 150 and a signal path between the at least one first electrode 173 and the printed circuit board 150. For example, the flexible printed circuit board 600 may function as a signal path delivering, to the speaker device 500, a sound signal or data presented from a processor 910 or audio codec 920 disposed on the printed circuit board 150 and, at the same time, function as a signal path delivering biometric information related electrical signal or data acquired by the at least one first electrode 173 to the processor 910 disposed on the printed circuit board 150 or the biometric sensor module 1076 electrically connected to the printed circuit board 150.

A wearable device of various example embodiments described above may include a housing including a first surface facing a first direction, a second surface facing a second direction opposite to the first direction, and a third surface at least partially surrounding a space between the first surface and the second surface, a printed circuit board disposed between the first surface and second surface of the housing, a speaker device disposed in a cavity formed by the third surface of the housing, between the first surface and second surface of the housing, a flexible printed circuit board disposed to surround at least a part of the speaker device and electrically connecting the speaker device and the printed circuit board, and including a conductive connector in a first area facing the third surface of the housing, and at least one first electrode connected to the conductive connector and electrically connected to the flexible printed circuit board.

According to various example embodiments, the third surface of the housing may include at least one first opening formed in a second area corresponding to the position of the speaker device, and a second opening formed in a third area spaced a specified distance apart from the second area.

According to various example embodiments, the at least one first electrode may be at least partially exposed to the outside of the third surface of the housing through the second opening while being connected to the conductive connector.

According to various example embodiments, the flexible printed circuit board may form a first signal path between the at least one first electrode and the printed circuit board, and a second signal path between the speaker deice and the printed circuit board.

According to various example embodiments, the wearable device may further include a plurality of second electrodes exposed to the outside through the second surface of the housing, and a biometric sensor module electrically connected to the at least one first electrode and the plurality of second electrodes.

According to various example embodiments, the biometric sensor module may provide an electrical signal or data value corresponding to body composition information of a user, based on a contact of a user's body with at least one of the at least one first electrode and the plurality of second electrodes.

According to various example embodiments, the third surface of the housing may include a support member and a side bezel structure of which an inner surface is coupled to an edge area of the support member.

According to various example embodiments, the cavity may be formed in an edge area of one side of the support member coupled to the inner surface of the side bezel structure.

According to various example embodiments, a second area of the third surface of the housing in which the at least one first opening is formed may include one area of the side bezel structure corresponding to the position of the speaker device disposed in the cavity.

According to various example embodiments, a third area of the third surface of the housing in which the second opening is formed may include one area of the side bezel structure corresponding to the position of the at least one first electrode connected to the conductive connector.

According to various example embodiments, the flexible printed circuit board may include a plurality of bends and be disposed to surround at least a part of the speaker device along an outer surface of the speaker device in a peripheral area of the speaker device.

According to various example embodiments, the flexible printed circuit board may be bent wherein the first area including the conductive connector faces the third area of the third surface of the housing in which the second opening is formed.

According to various example embodiments, the speaker device may include a vibration plate formed in one surface, and the vibration plate may be disposed, in the cavity, to face the second area of the third surface of the housing in which the at least one first opening is formed.

According to various example embodiments, the specified distance between the second area and third area of the third surface of the housing may correspond to a distance between the vibration plate formed in one surface of the speaker device and the at least one first electrode connected to the conductive connector.

According to various example embodiments, a sealing member may be disposed between the second opening and the at least one first electrode exposed through the second opening.

According to various example embodiments, the conductive connector may include a C-clip connector.

A wearable device of various example embodiments described above may include a housing including a first surface facing a first direction, a second surface facing a second direction opposite to the first direction, and a third surface at least partially surrounding a space between the first surface and the second surface, a printed circuit board disposed between the first surface and second surface of the housing, a speaker device disposed in a cavity formed by the third surface of the housing, between the first surface and second surface of the housing, a flexible printed circuit board disposed to surround at least a part of the speaker device and electrically connected to the printed circuit board, and including a first conductive connector in a first area facing the third surface of the housing, and at least one first electrode connected to the first conductive connector and electrically connected to the flexible printed circuit board.

According to various example embodiments, the at least one first electrode may be disposed to be at least partially exposed to the outside of the third surface of the housing through an opening formed in the third surface of the housing.

According to various example embodiments, the flexible printed circuit board may be electrically connected to the at least one first electrode, based on the first conductive connector, and form a first signal path between the at least one first electrode and the printed circuit board.

According to various example embodiments, the flexible printed circuit board may be electrically connected to the speaker device, based on the second conductive connector included in the second area, and form a second signal path between the speaker device and the printed circuit board.

According to various example embodiments, the wearable device may further include a plurality of second electrodes exposed to the outside through a second surface of the housing, and a biometric sensor module electrically connected to the at least one first electrode and the plurality of second electrodes.

According to various example embodiments, the biometric sensor module may provide an electrical signal or data value corresponding to body composition information of a user, based on a contact of a user's body with at least one of the at least one first electrode and the plurality of second electrodes.

According to various example embodiments, the flexible printed circuit board may include a plurality of bends ad be disposed to surround at least a part of the speaker device along an outer surface of the speaker device in a peripheral area of the speaker device.

According to various example embodiments, the flexible printed circuit board may be bent wherein the first area including the first conductive connector faces one area of the third surface of the housing in which the opening is formed.

According to various example embodiments, the third surface of the housing may include a support member and a side bezel structure of which an inner surface is coupled to an edge area of the support member.

According to various example embodiments, the cavity may be formed in an edge area of one side of the support member coupled to the inner surface of the side bezel structure.

According to various example embodiments, one area of the third surface of the housing in which the opening is formed may include one area of the side bezel structure corresponding to the position of the at least one first electrode connected to the first conductive connector.

According to various example embodiments, a sealing member may be disposed between the second opening and the at least one first electrode exposed through the second opening.

According to various example embodiments, the conductive connector may include a C-clip connector.

FIG. 10 is a diagram illustrating an example electronic device in a network environment according to various embodiments.

Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In various embodiments, at least one of the components (e.g., the connecting terminal 1078) may be omitted from the electronic device 1001, or one or more other components may be added in the electronic device 1001. In various embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to an embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of, the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to an embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element composed of or including a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In an embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and do not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term “non-transitory” refers to the storage medium being a tangible device, and does not include a signal (e.g., an electromagnetic wave), but this term does not differentiate between data being semi-permanently stored in the storage medium and data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable device comprising:

a housing comprising a first surface facing a first direction, a second surface facing a second direction opposite to the first direction, and a third surface at least partially surrounding a space between the first surface and the second surface;

a printed circuit board disposed between the first surface and second surface of the housing;

a speaker device disposed in a cavity formed by the third surface of the housing, between the first surface and second surface of the housing;

a flexible printed circuit board disposed to surround at least a part of the speaker device and electrically connecting the speaker device and the printed circuit board, and comprising a conductive connector in a first area facing the third surface of the housing; and at least one first electrode connected to the conductive connector and electrically connected to the flexible printed circuit board, wherein the third surface of the housing comprises:

at least one first opening formed in a second area corresponding to a position of the speaker device; and a second opening formed in a third area spaced a specified distance apart from the second area, wherein the at least one first electrode is at least partially exposed to the outside of the third surface of the housing through the second opening and is configured to be in contact with at least a portion of a user’s body, wherein the wearable device further comprises:

a plurality of second electrodes exposed to the outside through the second surface of the housing; and a biometric sensor module electrically connected to the at least one first electrode and the plurality of second electrodes, and wherein the biometric sensor module provides an electrical signal or data value corresponding to body composition information of a user, based on contact of the user's body with at least one of the at least one first electrode or the plurality of second electrodes.

2. The wearable device of claim 1, wherein the third surface of the housing comprises a support member and a side bezel structure of which an inner surface is coupled to an edge area of the support member, and the cavity is formed in an edge area of one side of the support member coupled to the inner surface of the side bezel structure.

3. The wearable device of claim 2, wherein a second area of the third surface of the housing in which the at least one first opening is formed corresponds to the position of the speaker device disposed in the cavity.

4. The wearable device of claim 2, wherein a third area of the third surface of the housing in which the second opening is formed corresponds to the position of the at least one first electrode connected to the conductive connector.

5. The wearable device of claim 1, wherein the flexible printed circuit board comprises a plurality of bends and is disposed to surround at least a part of the speaker device along an outer surface of the speaker device in a peripheral area of the speaker device.

6. The wearable device of claim 5, wherein the flexible printed circuit board comprises a first bend at which the first area comprising the conductive connector faces the third area of the third surface of the housing in which the second opening is formed.

7. The wearable device of claim 1, wherein the speaker device comprises a vibration plate formed in one surface thereof, and the vibration plate is disposed, in the cavity, to face the second area of the third surface of the housing in which the at least one first opening is formed.

8. The wearable device of claim 7, wherein the specified distance between the second area and third area of the third surface of the housing corresponds to a distance between the vibration plate formed in one surface of the speaker device and the at least one first electrode connected to the conductive connector.

9. The wearable device of claim 1, wherein a scaling member is disposed between the second opening and the at least one first electrode exposed through the second opening.

10. The wearable device of claim 1, wherein the conductive connector comprises a C-clip connector.

11. A wearable device comprising:

a housing comprising a first surface facing a first direction, a second surface facing a second direction opposite to the first direction, and a third surface at least partially surrounding a space between the first surface and the second surface;

a printed circuit board disposed between the first surface and second surface of the housing;

a speaker device disposed in a cavity formed by the third surface of the housing, between the first surface and second surface of the housing;

a flexible printed circuit board disposed to surround at least a part of the speaker device and electrically connected to the printed circuit board, and comprising a first conductive connector in a first area facing the third surface of the housing; and at least one first electrode connected to the first conductive connector and electrically connected to the flexible printed circuit board, wherein the at least one first electrode is disposed to be at least partially exposed to the outside of the third surface of the housing through an opening formed in the third surface of the housing and is configured to be in contact with at least a portion of a body of a user of the wearable device, wherein the flexible printed circuit board is electrically connected to the at least one first electrode, based on the first conductive connector, and provides a first signal path between the at least one first electrode and the printed circuit board, and is electrically connected to the speaker device, based on a second conductive connector comprised in a second area, and provides a second signal path between the speaker device and the printed circuit board, wherein the wearable device further comprises:

a plurality of second electrodes exposed to the outside through the second surface of the housing; and a biometric sensor module electrically connected to the at least one first electrode and the plurality of second electrodes, and wherein the biometric sensor module provides an electrical signal or data value corresponding to body composition information of a user, based on contact of the user's body with at least one of the at least one first electrode or the plurality of second electrodes.

12. The wearable device of claim 11, wherein the flexible printed circuit board comprises a plurality of bends and is disposed to surround at least a part of the speaker device along an outer surface of the speaker device in a peripheral area of the speaker device.

13. The wearable device of claim 12, wherein the flexible printed circuit board comprises a first bend at which the first area comprising the first conductive connector faces one area of the third surface of the housing in which the opening is formed.

14. The wearable device of claim 11, wherein the third surface of the housing comprises a support member and a side bezel structure of which an inner surface is coupled to an edge area of the support member, and the cavity is formed in an edge area of one side of the support member coupled to the inner surface of the side bezel structure.

15. The wearable device of claim 14, wherein one area of the third surface of the housing in which the opening is formed corresponds to a position of the at least one first electrode connected to the first conductive connector.

16. The wearable device of claim 11, wherein a sealing member is disposed between the opening and the at least one first electrode exposed through the opening.

17. The wearable device of claim 11, wherein the first conductive connector comprises a C-clip connector.

* * * * *